United States Patent Office 3,414,604
Patented Dec. 3, 1968

3,414,604
ORGANOFUNCTIONAL SILANES AND SILOXANES
Enrico J. Pepe, Kenmore, and Bernard Kanner, Tonawanda, N.Y., assignors to Union Carbide Corporation, a corporation of New York
No Drawing. Filed Dec. 31, 1964, Ser. No. 422,492
17 Claims. (Cl. 260—448.8)

ABSTRACT OF THE DISCLOSURE

Organofunctional silanes of the formula $$[Y-CH_2-Ar-(R)_n-]_a-\underset{\underset{R'_b}{|}}{Si}-X_{4-(a+b)}$$

wherein Ar is an arylene radical; R is an alkylene radical; R' is a monovalent hydrocarbon radical; X is —OR' and R' is as defined above; Y is R'O—, R'COO—, or R'O—(R"O)$_p$— wherein R' is as defined above; R" is an alkylene radical of at least two carbon atoms; $p$ is at least 1; $n$ is 0 or 1; $a$ is 1 to 3; $b$ is 0 to 2 and the sum of $a+b$ does not exceed 3; and organosiloxanes containing at least one unit of the formula:

$$[Y-CH_2-Ar-(R)_n-]_a-\underset{\underset{R'_b}{|}}{Si}-O_{\frac{4-(a+b)}{2}}$$

wherein Ar, R, R', Y, R", $p$, $n$, $a$, $b$ and the sum of $a+b$ are the same as defined above. The silanes are used to prepare siloxanes useful as lubricants, hydraulic fluids, coating resins for metals and fibers, elastomers, and non-ionic surfactants.

---

This invention relates to processes for the production of organofunctional silicon compounds, and to novel compounds produced by such processes. More particularly, this invention relates to processes for the production of organofunctional silanes and organofunctional siloxanes, and to novel organofunctional silanes and organofunctional siloxanes produced by such processes.

The organofunctional silanes which can be produced by the processes of the instant invention can be represented by the formula (1) $$[Y-CH_2-Ar-(R)_n-]_a-\underset{\underset{R'_b}{|}}{Si}-X_{4-(a+b)}$$

wherein Ar is an arylene radical; R is an alkylene radical; R' is a monovalent hydrocarbon radical; X is OR' and R' is as defined above; Y is R'O—, R'COO—, R'O—(R"O)$_p$—, or

wherein R' is as above defined, R" is an alkylene radical containing at least two carbon atoms, $p$ is an integer having a value of at least 1, and each R''' is hydrogen or a monovalent organic radical; $n$ is an integer having a value of from 0 to 1; $a$ is an integer having a value of from 1 to 3; and $b$ is an integer having a value of from 0 to 2, provided, however, that the sum of $a+b$ does not exceed 3. Preferably, $a$ has a value of 1 and the sum of $a+b$ does not exceed 2, as silanes having only a single hydrolyzable group attached to silicon are not useful in the preparation of polysiloxanes except as end-blocking units.

The arylene radicals represented by Ar in Formula 1 above can be either monocyclic, bicyclic, or a fused ring, and can be unsubstituted or substituted with substituents which are inert under the reaction conditions employed in the invention. Usually such radicals have from 6 to about 18 carbon atoms. Illustrative of such radicals are o-phenylene, m-phenylene, p-phenylene, tolylene, xylylene, nitrophenylene, t-butylphenylene, naphthylene, anthrylene, methylnaphthylene, diphenylene, and the like. Preferably Ar represents a phenylene radical, most preferably p-phenylene.

The alkylene radicals represented by R in Formula 1 above can be either straight or branched chain radicals, and can be unsubstituted or substituted with substituents which are inert under the reaction conditions employed in the invention. Usually such radicals have from 1 to about 12 carbon atoms, preferably from 1 to about 8 carbon atoms. Illustrative of such radicals are methylene, ethylene, propylene, butylene, pentylene, 2-ethylhexylene, and the like.

The monovalent hydrocarbon radicals represented by R' in Formula 1 above usually contain from 1 to about 18 carbon atoms, and can be unsubstituted or substituted with substituents which are inert under the reaction conditions employed in the invention. Such radicals include straight and branched chain alkyl radicals such as methyl, ethyl, n-propyl, isopropyl, n-butyl, isobutyl, n-pentyl, n-hexyl, 2-ethylhexyl, n-decyl, n-dodecyl, and the like; alkenyl radicals such as vinyl, allyl, and the like; cycloaliphatic radicals such as cyclopentyl, cyclohexyl, and the like; aryl radicals such as phenyl, nitrophenyl, naphthyl, p-phenylphenyl, and the like; aralkyl radicals such as benzyl, β-phenylethyl, and the like; and alkaryl radicals such as p-methylphenyl, p-cyclohexylphenyl, α-methylnaphthyl, and the like. Preferably R' is an alkyl radical containing from 1 to about 8 carbon atoms.

When Y of Formula 1 above represents R'O—, R'COO—, or R'O—(R"O)$_p$—, the monovalent hydrocarbon radicals represented by R' are bonded to ether or ester linkages to form hydrocarbyloxy or acyloxy groups. In the case of R'O—(R"O)$_p$—, each of the alkylene radicals represented by R" is bonded to an oxygen atom to form alkylene oxide units corresponding to —(R"O)$_p$— of the formula. Such alkylene oxide units are present in an amount equal to the value of $p$, which is at least 1, and preferably at least 4 up to about 30. When $p$ has a value greater than 1, each —(R"O)— group can represent the same or different alkylene oxide groups. The alkylene radicals represented by R" of alkylene oxide units —(R"O)— can be straight or branched chain radicals having from 2 to about 18 carbon atoms, preferably from 2 to 3 carbon atoms. Illustrative of such radicals are ethylene, propylene, butylene, pentylene, 2-ethylhexylene, octadecylene, and the like.

When Y of Formula 1 above represents

there can be two monovalent organic radicals bonded to nitrogen, or one hydrogen atom and one monovalent organic radical, or two hydrogen atoms, depending on whether R''' represents hydrogen or a monovalent organic radical. Preferably, each R''' is a monovalent organic radical. The monovalent organic radicals represented by R''' contain carbon and hydrogen atoms, and optionally other atoms, such as oxygen, provided, however, that such radicals are inert under the reaction conditions employed in the invention. Usually such radicals have from 1 to about 18 carbon atoms, preferably from 1 to 8 carbon atoms. Such radicals include straight and branched chain alkyl radicals such as methyl, ethyl, methacryloxyethyl, n-propyl, isopropyl, n-butyl, isobutyl, n-pentyl, n-hexyl, 2-ethylhexyl, n-decyl, n-dodecyl, and the like; alkenyl radicals such as vinyl, allyl, and the like; cycloaliphatic radicals such as cycopentyl, cyclohexyl, and the like; aryl radicals such as phenyl, nitrophenyl, naphthyl, p-phenylphenyl, and the like; aralkyl radicals such as benzyl, β-phenylethyl, and the like; and alkaryl radicals such as p-methylphenyl, p-cyclohexylphenyl, α-methylnaphthyl, and the like.

The organofunctional silanes of the instant invention are produced by reacting (a) an alkali metal compound represented by the formula (2)                 Y—M wherein Y is R'O—, R'COO—, or R'O—(R''O)$_p$—, and R', R'', and $p$ are as above defined with reference to Formula 1, and M is an alkali metal, preferably sodium or potassium, or (b) an amino compound represented by the formula (3)                 Y—H wherein Y is

and R''' is as above defined with reference to Formula 1, with a chloromethylarylsilane or a chloromethylaralkylsilane represented by the formula (4)     $\left[ ClCH_2-Ar-(R)_n- \right]_a - \underset{\underset{R'_b}{|}}{Si} - X_{4-(a+b)}$ wherein Ar, R, R', $n$, $a$, and $b$ are as above defined and wherein X is halogen or —OR' or R' is as above defined. The reactions which take place can be illustrated by the equations $Y-M + \left[ ClCH_2-Ar-(R)_n- \right]_a - \underset{\underset{R'_b}{|}}{Si} - X_{4-(a+b)} \longrightarrow$ $\left[ Y-CH_2-Ar-(R)_n- \right]_a - \underset{\underset{R'_b}{|}}{Si} - X_{4-(a+b)} + MCl$ and $Y-H + [ClCH_2-Ar-(R)_n-]_a - \underset{\underset{R'_b}{|}}{Si} - X_{4-(a+b)} \longrightarrow$ $[Y-CH_2-Ar-(R)_n-]_a - \underset{\underset{R'_b}{|}}{Si} - X_{4-(a+b)} + HCl$ Of course, in the second equation above, when one or both R''' radicals of the

radical represented by Y is hydrogen, such hydrogen atoms can react with additional chloroaryl or chloroaralkyl groups to cause condensation of 2 or 3 silane molecules. The amount of polycondensed silane produced compared to mono-condensed silane product depends upon the rate of reaction of the amino compound employed and the relative strength of the amine produced. Production of the monocondensed product is favored by the use of large excesses of the amino compound.

Silanes corresponding to Formula 4 above wherein X is halogen or OR', and R' is an alkyl radical, can be produced by reacting a suitable arylsilane or aralkylsilane with chloromethyl methyl ether and thionyl chloride, optionally in the presence of a catalytic amount of zinc chloride, at temperatures of from about 35° C. to about 120° C., to effect chloromethylation of the aryl radical of the silane, as disclosed in copending application Ser. No. 422,495, filed concurrently herewith, which disclosure is incorporated herein by reference.

When X is a halogen other than fluorine in Formula 4 above, it is possible to readily replace such halogen with OR' groups, wherein R' is a monovalent hydrocarbon radical as defined above with reference to Formula 1, by reacting the silane with a compound of the formula (5)              R'—OH wherein R' is as above defined. Although the reaction wherein the halogen atoms are replaced with OR' groups is spontaneous and proceeds without benefit of a catalyst even at room temperature, a small amount of an acid acceptor such as triethylamine can be employed to effect the removal of the last traces of halogen. Preferably a 10 mole percent to 20 mole percent excess of R'—OH is employed.

When X is fluorine in Formula 4 above, it is possible to replace such fluorine atoms with OR' groups, wherein R' is as defined above, by the catalyzed redistribution of silicon-fluorine and silicon-hydrocarbyloxy bonds as described in copending application Ser. No. 313,442, filed Oct. 3, 1963, now U.S. Patent No. 3,374,247, which disclosure is incorporated herein by reference. In accordance with that technique, a fluorosilane is heated in contact with a silicon compound (preferably a silane) containing at least one, and preferably at least three, hydrocarbyloxy groups directly attached to silicon, and with a redistribution catalyst such as tetrabutyltitanate, aluminum trichloride, tin dichloride, zirconium tetraethoxide, and the like, to effect redistribution of the silicon-fluorine and silicon-hydrocarbyloxy bonds.

Thus, by following the procedures outlined above, it is possible to produce all the silanes of Formula 4 above which are useful in the instant invention.

The organofunctional silanes of the instant invention are produced by reacting a silane of Formula 4 above with an alkali metal compound of Formula 2 above or an amino compound of Formula 3 above. When an alkali metal compound or a secondary amine is employed, it is preferred to use an equivalent amount of such compounds per stoichiometric equivalent of chloromethylaryl or chloromethylaralkyl group [ClCH$_2$—Ar—(R)$_n$]— of the silane to be reacted, but excesses up to about 10 mole percent are also suitable. When ammonia or a primary amine is employed, greater excesses are preferred, for example, from about 300 mole percent to about 500 mole percent in the case of a primary amine, and from about 500 mole percent to about 1000 mole percent in the case of ammonia.

The temperature employed in effecting reaction according to the instant invention is not narrowly critical and can vary over a wide range. Generally, temperatures of from about 0° C. to about 130° C. are preferred when employing an alkali metal compound, while temperatures of from about 35° C. to about 250° C. can be employed with an amino compound. Most preferably, temperatures of from about 25° C. to about 35 C. are employed with an alkali metal compound, while temperatures of from about 50° C. to about 100° C. are employed with an amino compound.

Atmospheric pressure is usually employed in effecting reaction as a matter of convenience. However, if desired, subatmospheric or superatmospheric pressures can also be employed. When ammonia is employed as one of the reactants, superatmospheric pressures are employed.

Reaction according to the instant invention can be carried out in bulk, or in an inert liquid solvent or diluent. By "inert" is meant nonreactive under the reaction conditions employed. Suitable inert solvents include n-hexane, benzene, toluene, xylene, n-heptane, dioxane, and the like. When an alkali metal compound is employed, it is preferable to employ a highly polar solvent in which the alkali metal compound has appreciable solubility and the byproduct metal chloride produced by the reaction does not, as reaction is generally aided by the use of such solvents. Suitable polar solvents include ketones such as acetone, ethers such as dioxane, dialkylformamides such as dimethylformamide, and the like. Dimethylformamide is particularly preferred.

The organofunctional silanes produced in accordance with the instant invention can be hydrolyzed and condensed in the conventional manner, either alone or together with other hydrolyzable silanes, to produce siloxanes containing at least one unit depicted by the formula (6)
$$[Y-CH_2-Ar-(R)_n-]_a-\underset{\underset{R'_b}{|}}{Si}-O_{\frac{4-(a+b)}{2}}$$

wherein Y, Ar, R, R', n, a, and b are as above defined. When the silanes of the instant invention are cohydrolyzed and condensed with other hydrolyzable silanes, the siloxanes produced can also contain at least one unit depicted by the formula (7)
$$R'_m-Si-O_{\frac{4-m}{2}}$$

wherein R' is a monovalent hydrocarbon radical as defined above with reference to Formula 1, and $m$ is an integer having a value of from 1 to 3. Such siloxane units are produced by the hydrolysis of silanes of the formula (8)
$$R'_m-Si-X_{4-m}$$

wherein R' and $m$ are as above defined, and X is halogen or OR'.

Thus, the organofunctional silanes of the instant invention can be employed to prepare siloxanes composed of units of the structure depicted by Formula 6, or siloxanes composed of one or more units depicted by Formula 6 and one or more units depicted by Formula 7. A small amount of hydrolyzable groups which have not been hydrolyzed can also be present in such siloxanes. When the siloxane is composed of units of Formula 6 and units of Formula 7, the siloxane can contain from 5 mole percent to 95 mole percent of each unit.

If desired, silanes of Formula 4 can be hydrolyzed and condensed either alone, or together with silanes of Formula 8, to produce siloxanes which can then be treated with an alkali metal compound of Formula 2 or an amino compound of Formula 3 to produce the organofunctional siloxanes described above. The proportions of ingredients and reaction conditions employed in producing organofunctional silanes can also be employed when a siloxane is treated with an alkali metal compound or an amino compound. However, to avoid siloxane rearrangement, temperatures above about 130° C. should be avoided when employing an alkali metal compound, while temperatures above about 225° C. should be avoided when employing an amino compound. The high reactivity of chloromethylaryl and chloromethylaralkyl groups at relatively low temperatures provides a convenient method of introducing organofunctional groups into siloxanes without siloxane rearrangement, in contrast to groups such as chloroalkyl which do not readily react with alkali metal compounds or amino compounds at temperatures mild enough to avoid siloxane rearrangement.

When siloxanes are employed it is also preferable to avoid an excess of base which will catalyze siloxane rearrangement. For this reason it is preferred to add the alkali metal compound or amino compound to the siloxane, preferably at the minimum temperature necessary to effect a reasonable rate of reaction.

The siloxanes prepared from the silanes of the instant invention are useful in conventional siloxane applications, including uses as lubricants, hydraulic fluids, coating resins for metals and fibers, and elastomers. Siloxane fluids prepared from such silanes are also useful non-ionic surfactants.

Example 1

To a 1-liter flask fitted to a distillation column packed with ¼" glass helices were charged 225 grams (0.30 mole) of a polyoxyalkylene compound having an average formula of $CH_3O(CH_2CH_2O)_{16}H$, and 500 grams of toluene. After removing 0.3 gram of water by azeotropic distillation in ½ hour, the mixture was allowed to cool and 16.2 grams (0.3 mole) of sodium methoxide were added. The mixture was then refluxed to produce methanol and the sodium salt of the starting polyoxyalkylene compound, with 175 milliliters of distillate boiling at a temperature of from 65–110° C. being removed in 16 hours.

The residue was then cooled and added over a one-hour period, by means of a dropping funnel, to a 2-liter flask containing a gently refluxing mixture of 100 grams (0.162 mole) of a siloxane of the formula $$Me_3SiO[ClCH_2C(CH_3)HCH_2SiMeO]_2SiMe_3$$

and 250 milliliters of toluene. After the addition was complete, refluxing was continued for an additional hour. After the mixture had cooled, 4 milliliters of concentrated aqueous HCl were added to neutralize residual basicity, followed by solid sodium bicarbonate to remove excess HCl. The mixture was then filtered through a frittered glass filter, and the filtrate was distilled to remove solvent. The residue was a light yellow compound weighing 301 grams, representing a 91 mole percent yield of $$Me_3SiO[CH_3O(CH_2CH_2O)_{16}CH_2\phi C(CH_3)\\HCH_2SiMeO]_2SiMe_3$$

The product had a melting point of about 30° C., and an index of refraction of 1.4778 and a viscosity of 277 centipoises when supercooled at 25° C.

*Analysis.*—Calculated for $C_{94}H_{182}Si_4O_{37}$: C, 55.9%; H, 9.1%; Si, 5.5%; Cl, 0.0%. Found: C, 55.1%; H, 8.9%; Si, 4.1%; Cl, 1.2%.

The product was useful in emulsifying a mixture of water and toluene.

Example 2

When the procedure of Example 1 was repeated in a similar manner with a siloxane of formula $$Me_3SiO[ClCH_2C(CH_3)HCH_2SiMeO]SiMe_3$$

a dark orange viscous fluid of $$Me_3SiO[CH_3O(CH_2CH_2O)_{16}\\CH_2C(CH_3)HCH_2SiMeO]SiMe_3$$

was obtained in high yield. The product had a melting point of about 30° C., a viscosity of 140 centipoises and an index of refraction of 1.4754 at 25° C.

The product was useful in emulsifying a mixture of water and toluene.

Example 3

When the procedure of Example 1 was repeated in a similar manner with a polyoxyalkylene compound of the formula $C_4H_9O-(CH_2CH_2O)_x(CH_2CH_2CH_2O)_yH$, wherein $x$ and $y$ are integers sufficient to impart a molecular weight of 1500 to the compound, a viscous fluid of $$Me_3SiO[C_4H_9O(CH_2CH_2O)_x(CH_2CH_2CH_2O)_y\\CH_2C(CH_3)HCH_2SiMeO]_2SiMe_3$$

was obtained. The product had a viscosity of 280 centipoises and an index of refraction of 1.4648 at 25° C.

When the above procedure was repeated with a siloxane of formula $Me_3SiO[ClCH_2C(CH_3)HCH_2SiMeO]SiMe_3$, a viscous fluid of $$Me_3SiO[C_4H_9O(CH_2CH_2O)_x(CH_2CH_2CH_2O)_y\\CH_2C(CH_3)HCH_2SiMeO]SiMe_3$$

was obtained. The product had a viscosity of 220 centipoises and an index of refraction of 1.4613 at 25° C.

Example 4

Equimolar amounts of beta-(chloromethylphenyl)ethyltriethoxysilane and sodium methacrylate were reacted in dimethylformamide solvent at a temperature of 125–135° C. for one hour. A 72 mole percent yield of beta-(methacryloxymethylphenyl)ethyltriethoxysilane was isolated by distillation. The product had a boiling point of 142–145° C. at 0.015–0.020 mm. Hg pressure, and an index of refraction of 1.4766 at 25° C.

*Analysis.*—Calculated for C₁₉H₃₀SiO₅: C, 62.3%; H, 8.3%; Si, 7.7%; (OEt), 36.9%. Found: C, 61.8%; H, 8.3%; Si, 7.8%; (OEt), 36.0%.

Example 5

A mixture of beta-(chloromethylphenyl)propyltriethoxysilane and four molar equivalents of diallylamine was heated at a temperature of 150° C. for 30 minutes, cooled, diluted with pentane and filtered to remove diallylamine hydrochloride. Distillation of the filtrate gave a high yield of beta-(diallylaminomethylphenyl)propyltriethoxysilane. The product had a boiling point of 157° C. at 0.4 mm. Hg pressure, an index of refraction of 1.4811 at 25° C., and a neutralization equivalent of 377.6 (theoretical=380).

*Analysis.*—Calculated for C₂₁H₃₅SiO₃N: C, 66.8% H, 9.3%; Si, 7.4%; N, 3.7%. Found: C, 66.6%; H, 9.0%; Si, 7.4%; N, 3.6%.

Example 6

A mixture of 33.1 grams (0.1 mole) of beta-(chloromethylphenyl)propyltriethoxysilane, 9.84 grams (0.12 mole) of sodium acetate, and 100 milliliters of dimethylformamide was refluxed for one hour, cooled, filtered, and vacuum distilled through a one foot Vigreux column. A quantitative yield of beta-(acetoxymethylphenyl)propyltriethoxysilane was obtained. The product had a boiling point of 127° C. at 0.07 mm. Hg pressure, and an index of refraction of 1.4698 at 25° C.

*Analysis.*—Calculated for C₂₈H₃₀SiO₅: C, 61.0%; H, 8.5%; Si, 7.9%; (OEt), 38.1%. Found: C, 60.5%; H, 8.7%; Si, 8.0%; (OEt), 35.7%.

Example 7

A mixture of 5.5 grams (0.24 mole) of sodium and 50 grams (1.1 mole) of ethanol was admixed with 60 grams (0.2 mole) of beta-(chloromethylphenyl)propylmethyldiethoxysilane. The resulting mixture was refluxed for 3 hours at 80° C., cooled, and filtered. Distillation of the filtrate under vacuum gave a 70 mole percent yield of beta-(ethoxymethylphenyl)propylmethyldiethoxysilane. The product had a boiling point of 115° C. at 0.5 mm. Hg pressure, and an index of refraction of 1.4727 at 25° C.

*Analysis.*—Calculated for C₁₇H₃₀SiO₃: C, 67.7%; H, 9.7%; Si, 9.9%. Found: C, 65.2%; H, 10.4%; Si, 9.1%.

What is claimed is:

1. Organofunctional silanes represented by the formula

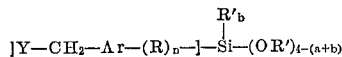

wherein Ar is an arylene radical having from 6 to 18 carbon atoms; R is an alkylene radical having from 1 to 12 carbon atoms; R' is a monovalent hydrocarbon radical having from 1 to 18 carbon atoms; Y is selected from the group consisting of R'O—, R'COO—, and

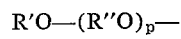

wherein R' is as defined above, R'' is an alkylene radical having from 2 to 18 carbon atoms and $p$ is an integer having a value of at least 1; $n$ has a value of from 0 to 1; $a$ is an integer having a value of from 1 to 3; and $b$ has a value of from 0 to 2, provided, however, that the sum of $a+b$ does not exceed 3.

2. Organofunctional silanes as defined in claim 1, wherein Y is R'O—; $a$ is an integer having the value of 1, and the sum of $a+b$ does not exceed 2.

3. Organofunctional silanes as defined in claim 1, wherein Ar is phenylene; R is an alkylene radical having from 1 to 8 carbon atoms; R' is an alkyl radical having from 1 to 18 carbon atoms; Y is R'O—, wherein R' is as defined above, $n$ is an integer having a value of 1; $a$ is an integer having a value of 1, and the sum of $a+b$ does not exceed 2.

4. Organofunctional silanes as defined in claim 1, wherein Y is R'COO—; $a$ is an integer having a value of 1, and the sum of $a+b$ does not exceed 2.

5. Organofunctional silanes as defined in claim 1, wherein Ar is phenylene; R is an alkylene radical having from 1 to 8 carbon atoms; R' is an alkyl radical having from 1 to 8 carbon atoms; Y is R'COO—, wherein R' is as defined above; $n$ is an integer having a value of 1; $a$ is an integer having a value of 1, and the sum of $a+b$ does not exceed 2.

6. Organofunctional silanes as defined in claim 1, wherein Y is R'O—(R''O)$_p$—; $a$ is an integer having a value of 1, and the sum of $a+b$ does not exceed 2.

7. Organofunctional silanes as defined in claim 1, wherein Ar is phenylene; R is an alkylene radical having from 1 to 8 carbon atoms; R' is an alkyl radical having from 1 to 8 carbon atoms; Y is R'O—(R''O)$_p$—, wherein R' is as defined above, R'' is an alkylene radical having from 2 to 3 carbon atoms, and $p$ is an integer having a value of from 4 to 30; $n$ is an integer having a value of 1; $a$ is an integer having a value of 1, and the sum of $a+b$ does not exceed 2.

8. Beta - (methacryloxymethylphenyl)ethyltriethoxysilane.

9. Beta-(acetoxymethylphenyl)propyltriethoxysilane.

10. Beta - (ethoxymethylphenyl)propylmethyldiethoxysilane.

11. A siloxane containing at least one unit of the formula

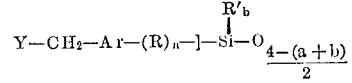

wherein Ar is an arylene radical having from 6 to 18 carbon atoms; R is an alkylene radical having from 1 to 12 carbon atoms; R' is a monovalent hydrocarbon radical having from 1 to 18 carbon atoms; Y is selected from the group consisting of R'O—, R'COO—, and

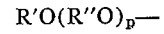

wherein R' is as defined above, R'' is an alkylene radical having from 2 to 18 carbon atoms, and $p$ is an integer having a value of at least 1; $n$ has a value of from 0 to 1; $a$ is an integer having a value of from 1 to 3; and $b$ has a value of from 0 to 2, provided, however, that the sum of $a+b$ does not exceed 3.

12. A siloxane as defined in claim 11, wherein Y is R'O—; $a$ is an integer having a value of 1, and the sum of $a+b$ does not exceed 2.

13. A siloxane as defined in claim 11, wherein Ar is phenylene, R is an alkylene radical having from 1 to 8 carbon atoms; R' is an alkyl radical having from 1 to 8 carbon atoms; Y is R'O—, wherein R' is as defined above; $n$ is an integer having a value of 1; $a$ is an integer having a value of 1, and the sum of $a+b$ does not exceed 2.

14. A siloxane as defined in claim 11, wherein Y is R'COO—; $a$ is an integer having a value of 1, and the sum of $a+b$ does not exceed 2.

15. A siloxane as defined in claim 11, wherein Ar is phenylene; R is an alkylene radical having from 1 to 8 carbon atoms; R' is an alkyl radical having from 1 to 8 carbon atoms; Y is R'COO—, wherein R' is as defined above; $n$ is an integer having a value of 1; $a$ is an integer having a value of 1, and the sum of $a+b$ does not exceed 2.

16. A siloxane as defined in claim 11, wherein Y is R'O—(R''O)$_p$—; $a$ is an integer having a value of 1, and the sum of $a+b$ does not exceed 2.

17. A siloxane as defined in claim 11, wherein Ar is phenylene; R is an alkylene radical having from 1 to 8 carbon atoms; R' is an alkyl radical having from 1 to 8 carbon atoms; Y is R'O—(R''O)$_p$—, wherein R' is as defined above, R'' is an alkylene radical having from 2 to 3 carbon atoms, and $p$ is an integer having a value of from 4 to 30; $n$ is an integer having a value of 1; $a$ is an integer having a value of 1, and the sum of $a+b$ does not exceed 2.

(References on following page)

References Cited

UNITED STATES PATENTS

| | | | |
|---|---|---|---|
| 2,998,406 | 8/1961 | Bailey et al. | 260—448.8 XR |
| 3,170,891 | 2/1965 | Speier | 260—448.8 XR |
| 3,258,477 | 6/1966 | Plueddemann et al. | 260—448.8 |
| 3,328,449 | 6/1967 | Haluska | 260—448.8 XR |
| 3,171,851 | 3/1965 | Pepe. | |

OTHER REFERENCES

Morrison and Boyd: "Organic Chemistry," Allyn and Bacon, Inc., Boston (1959), pp. 367, 412, and 526.

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,414,604            December 3, 1968

Enrico J. Pepe et al.

It is certified that error appears in the above identified patent and that said Letters Patent are hereby corrected as shown below:

Column 3, lines 33 to 39, that portion of the formula reading "Y-CH$_2$=Ar-" should read -- Y-CH$_2$-Ar- --. Column 5, lines 5 to 8, that portion of the formula reading $$\frac{4-(a+b)}{3}$$ should read $$\frac{4-(a+b)}{2}$$

Column 6, line 10, the formula should appear as shown below:

$$Me_3SiO[ClCH_2\phi C(CH_3)HCH_2SiMeO]_2SiMe_3$$

same column 6, lines 35 and 59, the formula, each occurrence, should appear as shown below:

$$Me_3SiO[ClCH_2\phi C(CH_3)HCH_2SiMeO]SiMe_3$$

same column 6, lines 40 and 62, the formula, each occurrence, should appear as shown below:

$$CH_2\phi C(CH_3)HCH_2SiMeO]SiMe_3$$

same column 6, line 55, the formula should appear as shown below:

$$CH_2\phi C(CH_3)HCH_2SiMeO]_2SiMe_3$$

Signed and sealed this 10th day of March 1970.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,414,604         Dated   December 3, 1968

Inventor(s) E.J. Pepe and B. Kanner

It is certified that error appears in the above-identified patent and that said Letters Patent are hereby corrected as shown below:

In claim 1, line 2, the left hand portion of the formula depicted as $$\text{"}[Y-CH_2-Ar-(R)_n-]\text{"}$$

should read $$--- [Y-CH_2-Ar-(R)_n-]_a ---$$

In claim 11, line 3, the left hand portion of the formula depicted as $$\text{"}Y-CH_2-Ar-(R)_n-]\text{"}$$

should read $$--- [Y-CH_2-Ar-(R)_n-]_a$$

SIGNED AND
SEALED
FEB 23 1971

(SEAL)
Attest:

Edward M. Fletcher, Jr
Attesting Officer

WILLIAM E. SCHUYLER, JR
Commissioner of Patents